United States Patent [19]
Darling

[11] Patent Number: 4,687,207
[45] Date of Patent: Aug. 18, 1987

[54] METHOD OF MANIPULATING PLAYING PIECES

[76] Inventor: Phillip H. Darling, 8027 Maple Dr., Buena Park, Calif. 90620

[21] Appl. No.: 852,783

[22] Filed: Apr. 16, 1986

[51] Int. Cl.⁴ .......................... A63F 3/00; A63F 9/08
[52] U.S. Cl. ................................. 273/271; 273/153 S
[58] Field of Search .............. 273/153 R, 153 S, 156, 273/271

[56] References Cited

U.S. PATENT DOCUMENTS

| | | | |
|---|---|---|---|
| 1,568,576 | 1/1926 | Stout | 273/153 R UX |
| 2,052,848 | 9/1936 | Schilling | 273/153 R UX |
| 4,541,634 | 9/1985 | Nolan | 273/271 |

*Primary Examiner*—Anton O. Oechsle
*Attorney, Agent, or Firm*—Knobbe, Martens, Olson & Bear

[57] ABSTRACT

A board game has sixteen playing pieces, arranged on a playing surface, in four rows and four columns. Each playing piece has a mark which is made visible by selectively orientating the piece. Players take turns orientating pieces. A point is scored each time four marks are arranged in a pattern corresponding to four of the numbers in Durer's magic square whose total is 34. The players can also rearrange the pieces by interchanging entire rows or columns in a manner which would not alter the corresponding property of Durer's square wherein corresponding rearrangements of Durer's numbers would still result in a sum of 34. A scoring sheet, indicating scoring patterns, can be used to keep score.

10 Claims, 26 Drawing Figures

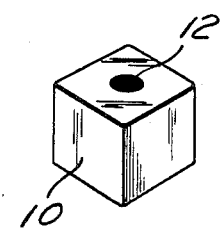
Fig. 1
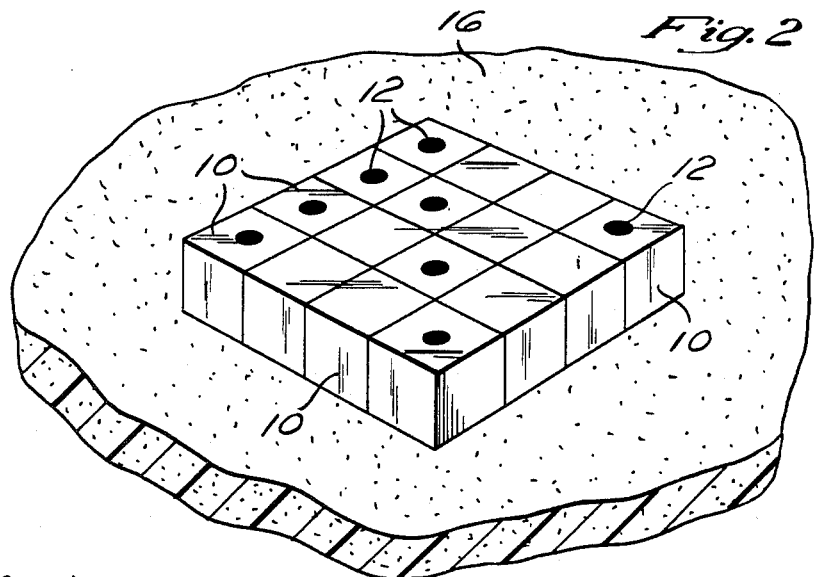
Fig. 2
|        | COLUMN 1 | COLUMN 2 | COLUMN 3 | COLUMN 4 |
|--------|----------|----------|----------|----------|
| ROW 1  | 16       | 3        | 2        | 13       |
| ROW 2  | 5        | 10       | 11       | 8        |
| ROW 3  | 9        | 6        | 7        | 12       |
| ROW 4  | 4        | 15       | 14       | 1        |
Fig. 3
|        | COLUMN 1 | COLUMN 2 | COLUMN 3 | COLUMN 4 |
|--------|----------|----------|----------|----------|
| ROW 1  |          |          |          |          |
| ROW 2  |          |          |          |          |
| ROW 3  |          |          |          |          |
| ROW 4  |          |          |          |          |
Fig. 4
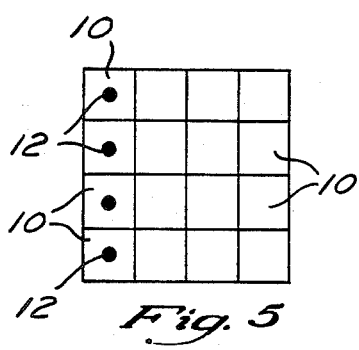
Fig. 5
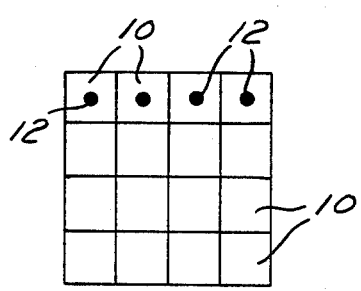
Fig. 6
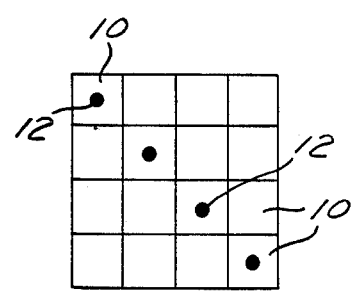
Fig. 7
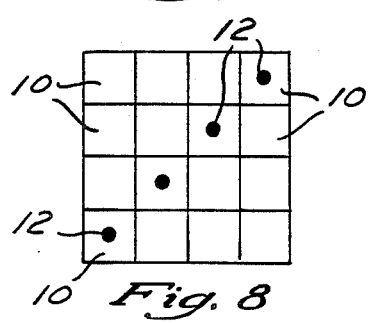
Fig. 8
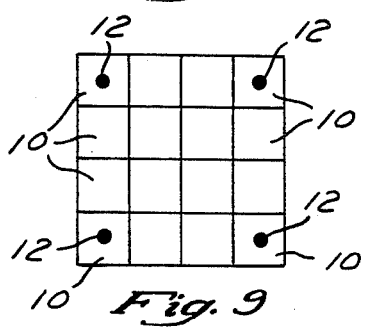
Fig. 9
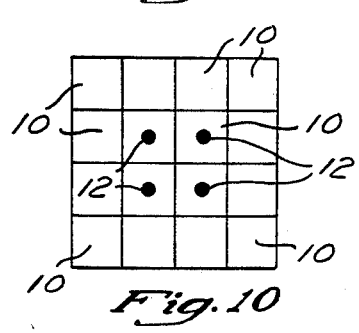
Fig. 10

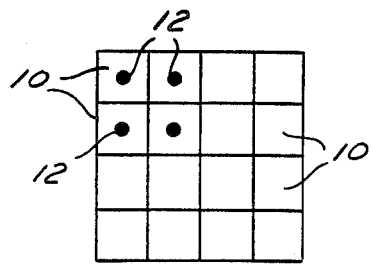
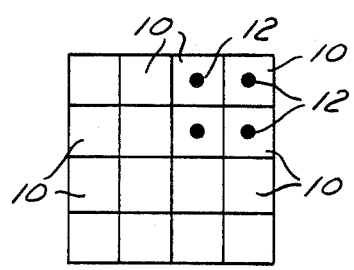
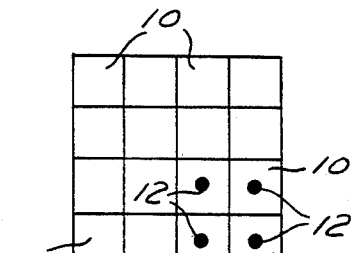
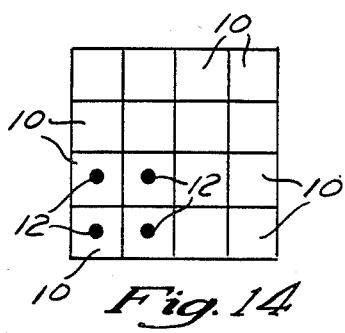
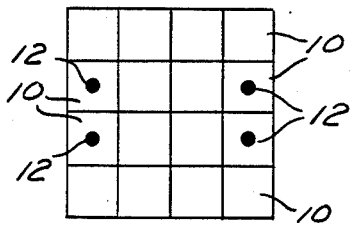
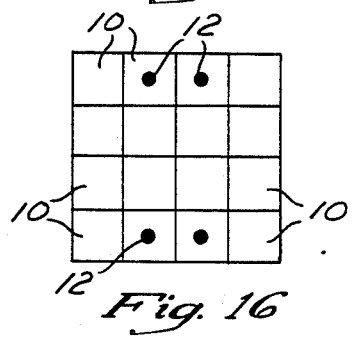
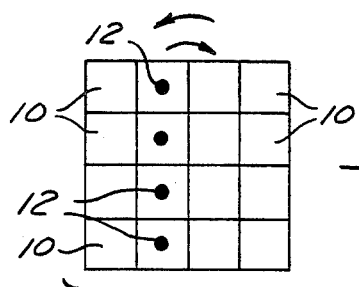
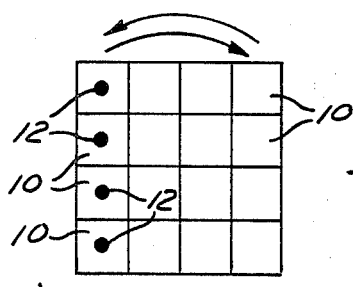
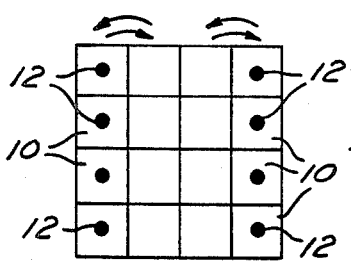

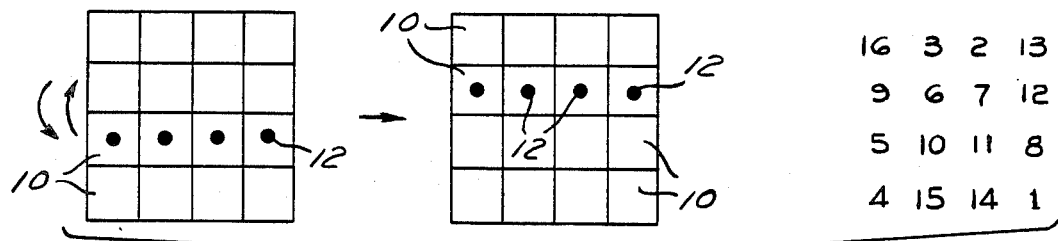
Fig. 20
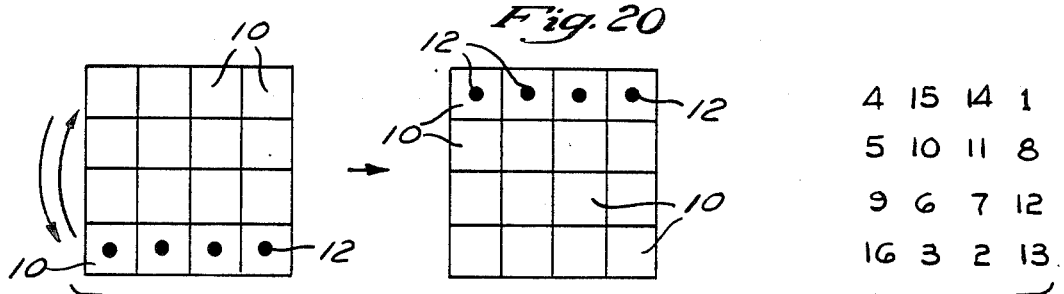
Fig. 21
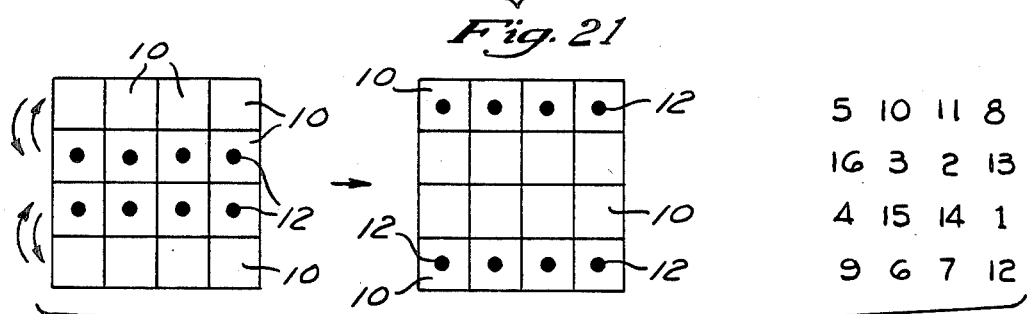
Fig. 22
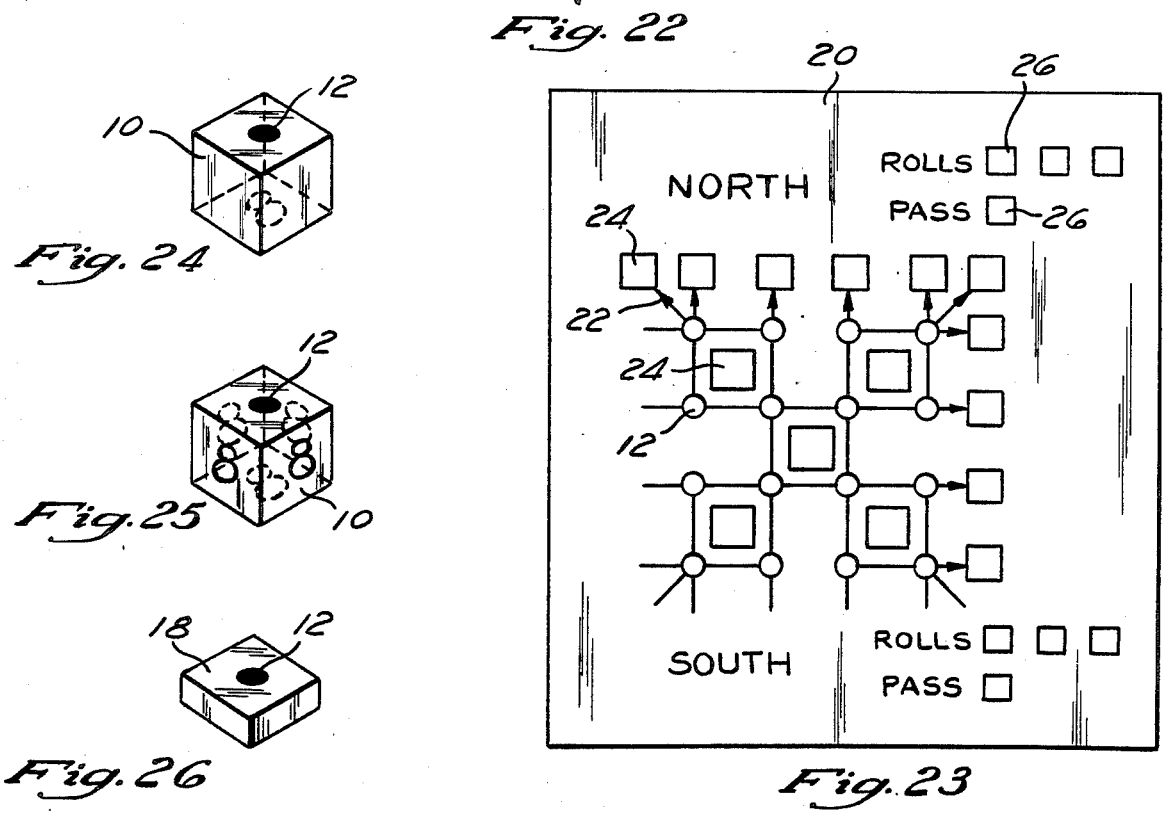
Fig. 24
Fig. 25
Fig. 26
Fig. 23

METHOD OF MANIPULATING PLAYING PIECES

BACKGROUND OF THE INVENTION

This invention relates to a parlor game played by a number of participants.

This parlor game involves a trait embodied in Albrecht Durer's magic square. Durer's magic square was developed about 1514 A.D. and consisted of a 4×4 arrangement of the numbers 1 through 16 as follows:

| 16 | 3  | 2  | 13 |
|----|----|----|----|
| 5  | 10 | 11 | 8  |
| 9  | 6  | 7  | 12 |
| 4  | 15 | 14 | 1  |

The "magic" in this arrangement is that the sum of any line of four numbers adds up to 34. The sum of four numbers in any row, any column, or either of the two diagonals adds up to 34. There are also several symmetrical combinations which add up to 34, such as the squares in each of the four corners formed by the three exterior corner numbers and the one interior number. Also there is an inner square formed by the four interior numbers.

The rows and columns can be symmetrically interchanged without altering these results. For example, the two interior rows and columns can be switched, the two exterior rows and columns can be switched, yet the sums still add up to 34.

The game of this invention is derived from Durer's magic square, with the game being called "34" game in honor of the magical arrangement, in which various numbers can be rearranged, yet consistently add up to 34.

SUMMARY OF THE INVENTION

In a parlor game, sixteen playing pieces are arranged on a playing surface to form a quadrilateral, such as a square. Each playing piece has one surface with a mark, such as a dot. The dot is initially placed against the playing surface so it will not be visible. Each player takes consecutive turns in either turning a cube so the dot is on the upper surface formed by the square, or to interchange entire rows or entire columns of playing pieces in a manner permitted by a corresponding interchange of the numbers in Durer's magic square, without altering the manner in which the numbers in Durer's square total 34. Once the dot is on the upper surface, that particular piece cannot be manipulated to place the dot against the playing surface.

A player scores a point for each arrangement of dots corresponding to one of the sums of "34" on Durer's magic square. Each arrangement is scored only once per game. For scoring convenience, there are preferably only 15 arrangements scored, the four rows, the four columns, and the two diagonals, the four corner squares, and the inner square. Each player is limited as to the number of times the rows or columns are interchanged. Each player is allowed to pass one turn, but cannot pass immediately after the previous player has passed.

Other objects, advantages and capabilities of the present invention will become more apparent with a further description of an illustrated embodiment, taken in conjunction with the accompanying drawings in which like similar parts have similar reference numerals, and in which:

FIG. 1 shows a playing piece and dot as used in this invention;

FIG. 2 shows a playing surface and square formed by the playing pieces of this invention;

FIG. 3 shows Durer's magic square;

FIG. 4 shows a starting arrangement of 16 playing pieces of this invention;

FIGS. 5-16 show various arrangements of the playing pieces of this invention.

FIGS. 17-22 show "rolls" of the rows and columns to rearrange the cubes of this invention;

FIG. 23 shows a scoring sheet for this invention; and

FIGS. 24-26 show alternate embodiments of the playing pieces of this invention.

DESCRIPTION OF THE PREFERRED EMBODIMENT

Referring to FIG. 1, there is shown a playing piece which can be of diverse shape, but preferably takes the form of cube 10. The cube 10 has six exterior surfaces, on one of which is located perceptible indicia such as a mark, but preferably taking the form of dot 12.

Referring to FIG. 2, a plurality of the cubes 10 are placed closely to one another on a playing surface 14. The playing surface 14 has an upper, exterior surface which is preferably a flat surface 16, on which a plurality of the cubes 10 are placed. The playing surface 14 is preferably of a resilient material such as a foam or sponge.

The plurality of cubes 10 are arranged in lines on the flat surface 16. Preferably the cubes 10 are arranged to form a quadrilateral, such as a square. Preferably, there are four cubes 10 on each side of the square so that there are a total of 16 of the cubes 10. Since the cubes 10 have flat surfaces, each of the plurality of cubes 10 can fit against adjacent cubes 10 to form the square arrangement.

As described in more detail hereinafter, the cubes 10 can be manipulated singly, or in groups, so that the dots 12 are made visible and arranged, or rearranged to form various scoring patterns. The object of the game is for each player to manipulate the cubes 10 so that the dots 12 form one of the predetermined number of scoring patterns, with the patterns preferably corresponding to an arrangement of numbers on Durer's magic square, which arrangement of numbers adds up to 34. Durer's magic square consists of a 4×4 arrangement of the numbers 1 through 16, into four rows and four columns, as shown in FIG. 3.

In practice, a plurality of players can play, but preferably only two players play at one time. Each player takes turns manipulating the cubes 10. At the start of the game, each of the cubes 10 has the dot 12 turned toward the playing surface 16 so that none of the dots 12 are visible on the upper surface of the square formed by the arrangement of the cubes 16. When a player's turn arrives, he or she has the option of turning over one of the cubes 10, so the dot 12 is on the upper surface of the square formed by the arrangement of the 16 cubes 10, and away from the flat surface 16. Alternately, a player could move an entire row or column of cubes 10, although it is preferred that the number of such movements be limited, preferably to 3 per game. Finally, a player could pass his or her turn, although it is preferred that a player not pass immediately after a preceding player has passed, and that the number of passes be limited, preferably so that each player can only pass once per game.

By manipulating the cubes 10, the players can form patterns of dots 12 which correspond to the manner in which numbers, correspondingly located on Durer's magic square, can be added in order to reach the total sum of 34. Referring to FIG. 2, there is shown an arrangement of sixteen cubes 10, arranged in four rows and four columns, corresponding to the four rows and four columns in Durer's magic square of FIG. 3.

The orientation of FIG. 4 comprises the starting orientation of the game. As shown in FIG. 4, there are no dots 12 (FIG. 2) visible on the upper surface of the square formed by the 16 cubes 10.

As the first player takes his or her turn, one of the sixteen cubes 10 can be turned over so that the dot 12 is visible. The dot 12 then symbolically represents one of the sixteen numbers of Durer's magic square of FIG. 3, and specifically represents the correspondingly located number. As each player takes a sequential turn, the dots 12 (FIG. 2.) will begin to form patterns on the upper surface of the square formed by the 16 cubes 10, with the patterns corresponding to the patterns of numbers in Durer's magic square of FIG. 3 which add up to the sum of 34. For each such pattern which is formed, a player can receive a point. Each such pattern is preferably scored only once per game.

Thus, for example, FIGS. 2 and 5 show an arrangement in which each of the four cubes 10 in the first column have been made visible. By analogy to FIG. 3, this corresponds to achieving the sum of the first column of numbers in Durer's magic square, 16, 5, 9, and 4, which equals 34. A similar arrangement of four of the dots 12 in any one of the columns 2, 3, or 4, of FIG. 2 or 5, would also result in scoring a point for each such arrangement since each of the numbers in the columns of FIG. 3 corresponding in location to the dots 12 would then total 34.

Referring to FIG. 6, there is shown an arrangement of the four cubes 10 in the first row such that the dots 12 on each of the cubes 10 is visible. This arrangement symbolically corresponds to each of the four numbers in the first row of Durer's magic square of FIG. 3, namely 16, 3, 2, and 13, the sum of which is 34. Thus, achieving the arrangement of FIG. 6 would result in the scoring of a point. A similar arrangement of four dots 12 on any one of the rows 2, 3, or 4, would result in scoring a point for each such arrangement, since the corresponding arrangement on Durer's square of FIG. 3 would also result in the numbers totaling 34.

Referring to FIGS. 2 and 7, there is shown an arrangement of the cubes 10 in which the dots 12 form a descending diagonal from the left to the right. This diagonal arrangement also results in the scoring of one point since the corresponding numbers in Durer's magic square FIG. 3, (16, 10, 7, and 1) total 34.

Referring to FIG. 8, there is shown an arrangement of the cubes 10 such that the dots 12 form an ascending diagonal. Thus arrangement also results in the scoring of one point since the sum of the corresponding elements in Durer's magic square of FIG. 3 adds up to 34.

Referring to FIG. 9, there is shown an arrangement of the cubes 19 such that the dots 12 are located in each of the four exterior corners of the square formed by the arrangement of the sixteen cubes 10. This arrangement also results in the scoring of one point since the corresponding numbers in Durer's magic square of FIG. 3 (16, 13, 1, and 4) adds up to 34.

FIG. 10 shows an arrangement of the cubes 10 in which the dots 12 are visible on the exterior surface of the four interior cubes 10 of the square formed by the arrangement of the sixteen cubes 10. This interior "square" arrangement also results in the scoring of one point since the four corresponding numbers of Durer's magic square of FIG. 3 (10, 11, 7, and 6) add up to 34.

Referring to FIG. 11, there is shown another "square" pattern of dots 12 whose corresponding number of Durer's magic square of FIG. 3 (16, 3, 10, and 5) add up to 34. The dots 12 are located on the cubes 10 falling in the upper left quadrant of the square formed by the sixteen cubes 10. Alternately phrased, the four cubes 10 having the dots 12 on their upper surfaces are located in the first two rows, and the first two columns.

FIG. 12 shows another "square" scoring pattern where four cubes 10 have the dots 12 visible on the upper surface, and are located in the upper right quadrant. Alternately phrased, these four cubes 10 are located in columns 3 and 4, and rows 1 and 2, of the square formed by the sixteen cubes 10. The numbers in Durer's magic square of FIG. 3 corresponding to these cubes 10 (2, 13, 8, and 11) again add up to 34.

FIG. 13 shows a similar "square" arrangement of four cubes 10 and dots 12 forming a square in the lower right hand corner of the square formed by the sixteen cubes 10. Alternately phrased, these four cubes 10 are located in the third and fourth rows, third and fourth columns of the square formed by the sixteen cubes 10. Again, the sum of the numbers in Durer's square of FIG. 3, (7, 12, 1, and 14) which numbers correspond to the location of these cubes 10, again equals 34.

FIG. 14 shows another "square" pattern of four cubes 10 and dots 12, this time located in the lower left hand corner of the square formed by the sixteen cubes 10. Alternately phrased, these four cubes are in the third and fourth rows, first and second columns, of the square formed by the sixteen cubes 10. Again, the sum of the numbers in the corresponding locations of Durer's magic square of FIG. 3 (9, 6, 4, and 15) totals 34.

Referring to FIG. 15, there is shown another pattern of cubes 10 and dots 12 whose corresponding numbers in Durer's magic square of FIG. 3, also add up to 34. This pattern is perhaps more accurately described as "rectangle." As shown in FIG. 15, these cubes 10 are located in rows 2 and 3, column 1, and rows 2 and 3, column 4. The corresponding numbers from Durer's square of FIG. 3 are 5, 9, 8 and 12.

Referring to FIG. 16, there is shown another "rectangle: pattern of cubes 10 and dots 12 whose corresponding numbers in the Durer square of FIG. 3 (3, 2, 14, and 15) again add up to 34. As shown in FIG. 16, these four cubes 10 are located in row 1, columns 2 and 3, and row 4, columns 2 and 3, of the square formed by the sixteen cubes 10.

There are six ways in which Durer's magic square of FIG. 3 can have entire rows or columns interchanged, yet not alter the manner in which the numbers can be added to reach the sum of 34. A corresponding rearrangement of the rows and columns of cubes 10 can thus also be used in an attempt to score points. This interchanging or rows or columns is called "rolling" the rows or columns of the square.

Referring to FIG. 17, the inside columns 2 and 3 can be interchanged, or "rolled." The corresponding rearrangement of the numbers in Durer's magic square is also shown, and does not alter the various patterns in which the numbers can be added to total 34. If there were a column of dots 12 on cubes 10 in column 2, which was interchanged with column 3, then a point could be scored for being the first player to complete and score the column of dots in column 3.

In a similar manner, the outside columns of cubes 10 and dots 12 can be interchanged, or "rolled," as shown in FIG. 18. The corresponding rearrangement in Durer's magic square is also shown in FIG. 18, and does not alter the various manners in which the numbers can be added to obtain the sum of 34. If the first column contains a row of dots 12 and that column is interchanged with the fourth column which had not bee previously scored, then an additional point would be scored for completing the pattern of dots 12 in the fourth column.

Referring to FIG. 19, the columns are "rolled" or turned inside out. Alternately phrased, exterior columns 1 and 4 are exchanged with interior columns 2 and 3, respectively. The corresponding rearrangement of Durer's magic square is also shown, and it is again observed that the sum of the numbers in the various patterns still add up to 34.

The rows can be manipulated in the same manner as the columns in order to score points. Referring to FIG. 20, the inside rows 2 and 3 can be interchanged or "rolled" to score points. The corresponding rearrangement of Durer's magic square of FIG. 3 is also shown in FIG. 20. Again, the rearrangement of the inside rows still results in the various combinations of numbers adding up to 34.

FIG. 21 shows the outer rows 1 and 4 being "rolled" or interchanged. The corresponding rearrangement of Durer's magic square is also shown. Again the sum of the corresponding numbers and patterns in Durer's rearranged square total 34.

FIG. 22 shows the rows being turned or "rolled" inside out, in which exterior rows 1 and 4 are interchanged with the adjacent interior rows 2 and 3, respectively. The corresponding rearrangement of Durer's magic square is also shown. Again, the addition of numbers in the various patterns still add up to 34. FIG. 22 also illustrates one manner in which turning the rows inside out can be used to score points. In FIG. 22, the interior rows 2 and 3 are shown as previously scored since dots 12 on the cubes 10 are visible on each cube 10 in rows 2 and 3. Turning the rows inside out places the dots 12 on the exterior rows 1 and 2, thereby scoring each of those rows.

There are additional symmetric patterns of numbers in Durer's magic square whose sums also total 34, even when the square is rearranged as described above. Some of the patterns may appear asymmetric, but they are symmetric about a skew axis. If each number is given two digit code m,n, the first digit m being for the row, and the second digit n being for the column, then the four cubes 10 in the pattern of FIG. 9 can be described as 1,1; 1,4; 4,4; and 4,1. Using this nomenclature, an additional pattern would be 2,1; 1,3; 3,4; and 4,2. A further pattern would be 1,2; 2,4; 4,3; and 3,1. A further pattern would be 1,1; 1.2; 4,3; and 4,4. A further pattern; would be 1,3; 1,4; 4,1; and 4,2. A further pattern would be 1,1; 2,1; 3,4; and 4,4. A further pattern would be 1,4; 2,4; 3,1; and 4,1. A further pattern would be 1,1; 2,3; 3,2; and 4,4. A further pattern would be 1,4; 2,2; 3,3; and 4,1. A further pattern would be 1,2; 2,3; 3,2; and 4,3. A further pattern would be 1,3; 2,2; 3,3; and 4,2. A still further pattern would be 2,2; 2,4; 3,1; and 3,3. There are additional patterns.

As previously mentioned, players score points when a group of four cubes 10 is arranged so that the dots 12 are visible on each of those cubes 10, and the new arrangement of any of the cubes 10 corresponds to one of the patterns on Durer's magic cube of FIG. 3 by which Durer's numbers add up to the total of 34. Since each of these patterns totals 34, each corresponding arrangement of the cubes 10 and dots 12 is referred to as a "34" group.

It is possible to increment the number on each cube 10 by a fixed amount, and still retain the magic of Durer's square, but have the sum of the various patterns change. For example, if each number in Durer's square is increased by 10, then each sum of four numbers would total 74 instead of 34. For example, the numbers in the first column of Durer's square of FIG. 3 would become 26, 15, 19 and 14 instead of 16, 5, 9 and 4, and the sum of those numbers would be 74 instead of 34. Interchanging the rows and columns does not alter the increased sum, or affect the manner in which the numbers can be rearranged.

Preferably, there are fifteen patterns or "34" groups scored, with each pattern being scored only once. The fifteen patterns would be the four columns as represented by FIG. 5, the four rows, as represented by FIG. 6, the two diagonals of FIGS. 7 and 8, the four "squares" in each corner as indicated in FIGS. 11–14, and the "square" in the middle as indicated in FIG. 10.

It is possible to score more than one point on a move. For example, a person turning the cube 10 in the first row and first column of FIG. 2, would complete both the diagonal and the first column, and thus could score two points for one move. As previously mentioned, it is preferred that each pattern be scored only once. Thus the prior scoring of either the patterns in FIG. 2 would preferably not result in an additional score.

It is preferred that two people play, although the game need not be limited to only two players. The players alternate turns, with each player either turning over or "rolling" one cube cube 10 during his or her turn, or interchanging or "rolling" the rows or columns in one of the six methods as shown in FIGS. 17–22. Once a cube 10 has been turned so that the dot 12 is visible on the upper surface of the square formed by the 16 cubes 10, it preferably cannot be subsequently turned to conceal the dot 12 during the remainder of the game. Preferably, each player is limited as to the number of times the rows and columns can be "rolled," with the players each being limited to three rolls of the rows and columns per game.

Preferably each player can pass one time per game, except that a player may not pass immediately after a pass of the previous player. Thus, there cannot be two passes in a row.

When a player turns over the last cube 10 in one of the patterns forming a "34" group, a point is scored. When a player rolls a row or column containing previously turned over cube or cubes 10, to form a previously unscored "34" group, the player again scores.

Completed groups or patterns of "34" must be scored during a player's turn. Once a player indicates he or she is done, his or her opponent may proceed to score any completed, but unnoticed and unscored points before the opponent makes his or her move.

FIG. 23 shows a scoring sheet 20 which can be used to keep track of each of the "34" patterns as they are scored. The scoring sheet 20 has indicia thereon indicating the various scoring patterns and provides means to score the various patterns. The scoring sheet 20 is preferably for two players, designated as "North" and "South" on the sheet 20.

The sixteen dots 12, representing the sixteen cubes 10 (FIG. 2) are shown on the scoring sheet 20 in a square arrangement, with each of the linear scoring patterns of "34" being indicated by indicia such as arrows 22. Thus the row, column, and diagonal scoring patterns which are scored by placing the dots 12 in linear arrangements, are indicated by arrows 22 along each of the respective rows, columns, and diagonals.

A box 24 at the end of each arrow can be used to indicate whether that particular row, column, or diagonal has been scored.

Three record keeping squares 26 are provided adjacent a heading "Rolls" in order to keep track of how many rolls of the rows or columns each player has used. Another record keeping square 26 is provided adjacent a label "Pass" in order to keep track of whether a player has used his or her pass during that game.

In the scoring sheet 20 of FIG. 23, only five of the "squares" are scored. These are the squares in the upper left corner, upper right corner, lower right corner, lower left corner, and center. These squares correspond to FIGS. 10-14. As indicated in FIGS. 9, 15 and 16, and above, there are other "34" patterns, but these patterns are not scored in the preferred embodiment. Each of the square scoring patterns is scored on the scoring sheet 20 of FIG. 23 by checking a box 24 surrounded by the four dots 12 defining that particular square scoring pattern.

There are a total of fifteen patterns scored in the preferred embodiment. A game ends when all fifteen of the preferred "34" groups have been scored, even if all of the cubes 10 have not been turned over. Thus, a total of fifteen points can be scored in each game.

In an alternate embodiment of this invention, other "squares" and "rectangles" and other patterns representing "34" patterns would be scored. These remaining "squares" and "rectangles" are illustrated in FIGS. 9, 15, and 16, with additional patterns being described above.

In a further embodiment of this invention the cubes 10 could have marks or perceptible indicia; placed upon more than one surface of the cube 10 on which the dot 12 is located. Thus, for example, as shown in FIG. 24, a cube 10 could have a number such as "8" on the surface opposite the surface on which dot 12 is located. It is further possible to have each of the 16 cubes 10 with a different number thereon, such as numbers varying from 1 through 16, so that the cubes 10 could be arranged to have the numbers corresponding to those in Durer's magic square of FIG. 3. In this manner, the numbers on each cube 10 could be used to verify the accuracy of the movement of the cubes 10, and could further be used as an educational device and method to teach addition of the numbers on the cubes 10 as the game of this invention is played.

In a still further embodiment, as shown in FIG. 25, there is a cube 10 which has indicia, such as numbers, on a plurality of the surfaces of the cube 10. In this further embodiment, there are numbers on the five surfaces of the cube 10 other than the surface on which the dot 12 is located.

The use of cubes 10 allows the rows or columns of cubes 10 to be picked up and moved merely by grabbing the entire row or column of cubes 10 between a person's thumb and forefinger. The abutting surfaces of the cubes 10 provide a sufficiently large and stable contact area so that the row or column of cubes 10 can be held in a person's hand. Alternately phrased, the abutting surfaces of the playing pieces cooperate to allow a plurality of the playing pieces to be moved at once.

Referring to FIG. 26, there is shown a rectangular block 18, having one cross-section which is generally square in shape, and having a generally square surface on which is located a dot 12. The other cross-sections have a rectangular shape, so the block 18 has a rectangular shape. The use of rectangular blocks 18 to bear the dots 12 does not allow, or at least makes it difficult, to grab a row or column of blocks 18 by hand in order to interchange entire rows or columns of the blocks 18. However, rectangular block of FIG. 26 could still be used albeit not as conveniently as the cubes 10 (FIG. 1).

I claim:

1. A method of manipulating sixteen playing pieces closely arranged in a 4×4 square having four rows and four columns, each of said pieces having a first surface with indicia on said surface, comprising the steps of:
    manipulating said playing pieces individually to display said indicia, or interchanging entire rows or columns of four of said pieces in one of the following manners:
    interchanging two outside rows:
    interchanging two outside columns;
    interchanging two inside rows;
    interchanging two inside columns;
    interchanging the outside rows with the immediately adjacent rows; or
    interchanging the outside columns with the immediately adjacent columns; and
    scoring a point for an arrangement of indicia corresponding to one of the following patterns:
    four indicia in one of the four rows;
    four indicia in one of the four columns;
    four indicia in one of the two diagonals;
    four indicia in the upper left quadrant of said square;
    four indicia in the upper right quadrant of said square;
    four indicia in the lower right quadrant of said square; or
    four indicia in the interior pieces of said square.

2. A method as defined in claim 1, wherein said scoring arrangement further includes the following patterns:
    four indicia on each corner of said square
    four indicia in the first and fourth rows, and the second and third columns of said square; or
    four indicia in the second and third rows, and the first and fourth columns of said square.

3. A method of manipulating sixteen playing pieces so a plurality of players can play a game based on Durer's magic square, wherein each of said pieces has indicia thereon, and each of said pieces is moveable so as to selectively display said indicia, comprising:
    arranging said pieces to form a four by four quadrilateral having four rows and four columns;
    alternating turns among players to manipulate said pieces to orient said indicia to be on a visible surface;
    scoring a point for each arrangement of four of said indicia visible on said visible surface, which arrangement corresponds to four numbers on said magic square which numbers add up to 34.

4. A method as defined in claim 3 further comprising the step of:
    interchanging two of said rows of pieces.

5. A method as defined in claim 4 further comprising the step of:
   interchanging two of said columns of pieces.

6. A method as defined in claim 4 further comprising the step of:
   interchanging the outside rows with the immediately adjacent rows and also interchanging the outside columns with the immediately adjacent columns.

7. A method as defined in claim 4 further comprising the step of:
   allowing a player to pass a turn except when the immediately preceding player also has passed.

8. A method as defined in claim 5, further comprising the step of:
   limiting the number of times a player can interchange said rows and interchange said columns.

9. A method as defined in claim 4, further comprising the step of:
   scoring each pattern only once, by the first player who elects to score said pattern during said player's turn.

10. A method as defined in claim 7, further comprising the step of:
    using a scoring sheet to keep track of said scores wherein said scoring sheet has indicia thereon indicating each of the patterns for which a score may be awarded, a means for indicating said pattern has been scored, and which player scored said pattern.

* * * * *